UNITED STATES PATENT OFFICE.

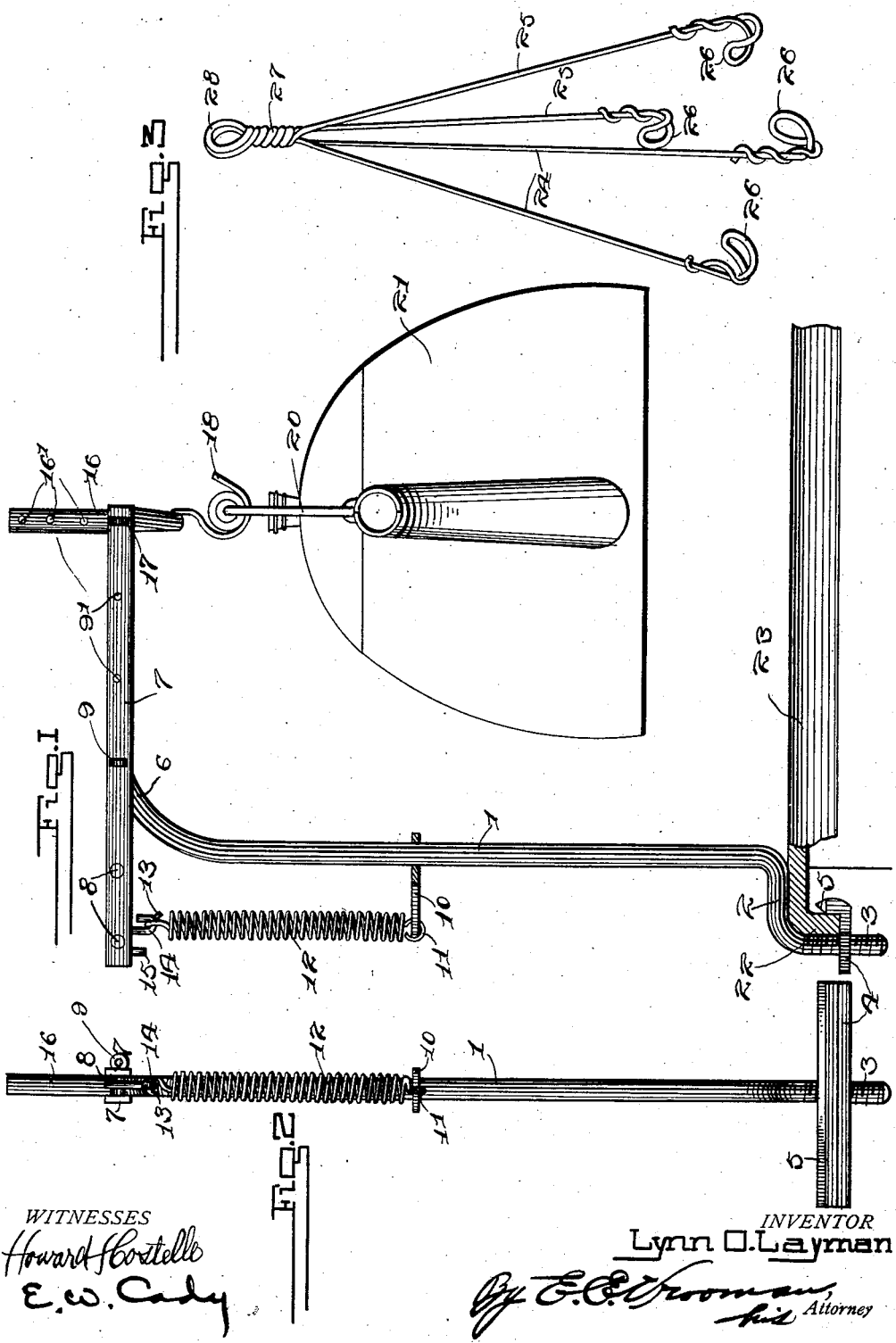

LYNN OREN LAYMAN, OF FORT COLLINS, COLORADO.

SAFETY BOILING DEVICE.

1,024,791. Specification of Letters Patent. Patented Apr. 30, 1912.

Application filed July 6, 1911. Serial No. 637,212.

*To all whom it may concern:*

Be it known that I, LYNN OREN LAYMAN, a citizen of the United States, residing at Fort Collins, in the county of Larimer and State of Colorado, have invented certain new and useful Improvements in Safety Boiling Devices, of which the following is a specification, reference being had therein to the accompanying drawing.

This invention relates to means for supporting cooking utensil over a stove or fire and has for its object to provide an improved device by means of which the articles of food contained in the receptacle located over a stove or fire will be prevented from burning.

The invention has for its object to provide an improved device by means of which a receptacle containing food to be cooked may be suspended over a stove or fire and will be automatically moved away from the same when there is danger of burning the contents of the receptacle by overheating the same.

Referring to the accompanying drawings:—Figure 1 is a view in elevation of a device for suspending a receptacle filled with material to be cooked, said device being constructed in accordance with this invention, and shown as supporting a cooking utensil above a range. Fig. 2 is an end view in elevation of the device. Fig. 3 is a view of a device for clamping and suspending a cooking utensil from the device shown in Fig. 1.

In carrying out the invention a vertical rod 1 is employed bent at a right angle adjacent to its lower end to form a shouldered portion 2 with a depending screw threaded end portion 3. Mounted upon the threaded end portion 3 is a transverse bar 4 having an upwardly curved flange 5 for a purpose hereinafter set forth. The upper end of the rod 1 is formed with a curved end portion 6 which is located between a pair of parallel bars 7 secured together by rivets 8 located at intervals apart adjacent to one end thereof, said curved portion 6 of the rod 1 being pivotally mounted between the bars 7 by means of a pivot pin 9 adapted to engage one of a series of holes 9' in the bar 7. Slidably mounted upon the rod 1 is a tilting rack pawl 10 connected at its outer end to a hook 11 on one end of a coil spring 12, a hook 13 at the other end of said coil spring engaging a hook 14 on one end of a hook 15 which is detachably mounted on one of the rivets 8. Projecting between the outer ends of the bars 7 is a vertical bar 16 adjustably mounted thereon by means of a pin 17 which passes through the bars 7 and which is adapted to engage holes 16' in the bar 16 so as to adjustably raise and lower the latter. The lower end of the bar 16 is provided with a hook 18 adapted to engage the bail 20 of a cooking utensil 21. When the device is in use it may be clamped to the flange 22 of a range 23 by hooking the flange 5 of the plate 4 over the flange 22, the shoulder 2 of the rod 1 bearing down upon the top of the range 23. The parts being in the normal position shown in Fig. 1, the receptacle 21 is filled with food to be cooked and the weight thereof together with the water contained therein will cause the arm formed by the bars 7 to tilt, thereby bringing the receptacle 21 to the range 23, the spring 12 being extended under tension by the tilting of the bars 7. As the water boils away in the receptacle 21 the latter becomes lighter and will be raised away from the fire by the reaction of the coil spring 12 thereby preventing the food being cooked from being scorched or burned. The receptacle 21 may be located at any desired distance from the fire by the vertically adjusting bar 16 and the tension of the coil spring 12 may be adjusted either by slidably adjusting the rack pawl 10 on the rod 1 or by changing the hook 15 from one pivot pin 8 to another or by adjusting the bars 7 longitudinally on the curved end 6 of the rod 1 by changing the pin 9 in the holes 9'.

In Fig. 3 is shown a device adapted to engage a cooking utensil and to be suspended from the hook 18, said device consisting of a pair of wire rods each formed in one piece and bent to form the extensions 24 and 25, respectively thereof and terminating at their lower ends in hooks 26 which are formed by bending the ends of the wires to form said hooks and twisting the wires about the extensions 24 and 25, the upper ends of the extensions 24 and 25 being twisted together as shown at 27 and terminating in a loop 28 which is adapted to engage with the hook 18.

What I claim is:—

1. A device for suspending a cooking utensil over a fire, consisting of a vertical rod, having means at its lower end for securing it in elevated position, a tilting arm pivotally mounted between its ends to the upper end of said rod, a rack pawl slidably mounted upon said rod, a coil spring connected at one end to said rack pawl, and at its other end to one end of said tilting arm, and means at the other end of said tilting arm for suspending a cooking utensil.

2. A device for supporting a cooking utensil over a range consisting of a vertical rod, having a shouldered lower end, a clamping bar adjustably mounted on the lower end of said rod and engaging a support, a tilting arm pivotally mounted between its ends to the upper end of said rod, a rack pawl slidably mounted on said rod, a coil spring connected at one end to said rack pawl and detachably connected at its other end to said tilting arm, and a vertical arm adjustably mounted in the outer end of said tilting arm, and having a hook adapted to engage the bail of a cooking utensil.

In testimony whereof I hereunto affix my signature in presence of two witnesses.

LYNN OREN LAYMAN.

Witnesses:
JOHN W. SCOTT,
C. R. WELCH.

---

Copies of this patent may be obtained for five cents each, by addressing the "Commissioner of Patents, Washington, D. C."